US010178614B2

(12) United States Patent
Liu et al.

(10) Patent No.: US 10,178,614 B2
(45) Date of Patent: Jan. 8, 2019

(54) POWER SAVING WI-FI TETHERING

(71) Applicant: Microsoft Technology Licensing, LLC, Redmond, WA (US)

(72) Inventors: Yunxin Liu, Beijing (CN); Guobin Shen, Beijing (CN); Yongguang Zhang, Beijing (CN); Hao Han, Williamsburg, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 14/967,012

(22) Filed: Dec. 11, 2015

(65) Prior Publication Data
US 2016/0100359 A1 Apr. 7, 2016

Related U.S. Application Data

(63) Continuation of application No. 13/669,653, filed on Nov. 6, 2012, now Pat. No. 9,247,495.

(51) Int. Cl.
*H04W 52/02* (2009.01)
(52) U.S. Cl.
CPC ... *H04W 52/0206* (2013.01); *H04W 52/0216* (2013.01); *Y02D 70/00* (2018.01); *Y02D 70/12* (2018.01); *Y02D 70/124* (2018.01); *Y02D 70/126* (2018.01); *Y02D 70/142* (2018.01); *Y02D 70/26* (2018.01)
(58) Field of Classification Search
None
See application file for complete search history.

(56) References Cited

U.S. PATENT DOCUMENTS

| 7,505,795 | B1 | 3/2009 | Lim et al. |
| 2004/0235536 | A1 | 11/2004 | Kim et al. |
| 2005/0054389 | A1* | 3/2005 | Lee ............... H04W 52/0225 455/574 |
| 2006/0203766 | A1 | 9/2006 | Kim et al. |
| 2007/0242786 | A1 | 10/2007 | Kim et al. |
| 2010/0091695 | A1 | 4/2010 | Gao et al. |
| 2010/0177660 | A1 | 7/2010 | Essinger et al. |
| 2010/0185820 | A1 | 7/2010 | Hughes et al. |

(Continued)

OTHER PUBLICATIONS

Zhang et al., "Power Saving Access Points for IEEE 802.11 Wireless Network Infrastructure," IEEE Communications Society, Wireless Communications and Networking Conference, Mar. 21-25, 2004, vol. 1, pp. 195-200, 6 pages.

(Continued)

*Primary Examiner* — Kouroush Mohebbi
(74) *Attorney, Agent, or Firm* — Rainier Patents, P.S.

(57) ABSTRACT

The techniques discussed herein reduce the power consumption of a Wi-Fi tethering device by switching the Wi-Fi functionality of the Wi-Fi tethering device from a normal operational mode to a sleep mode during idle intervals. The techniques implement a sleep protocol where a Wi-Fi tethering device and the Wi-Fi client device coordinate and establish a sleep schedule. Moreover, the techniques describe a sleep interval adaptation algorithm to establish sleep duration intervals based on data packet exchange patterns associated with different applications executing on the Wi-Fi client device and/or different operations being performed by the Wi-Fi client device.

20 Claims, 8 Drawing Sheets

(56) References Cited

U.S. PATENT DOCUMENTS

| | | | |
|---|---|---|---|
| 2010/0208636 A1 | 8/2010 | Kim et al. | |
| 2010/0278065 A1 | 11/2010 | Sun et al. | |
| 2010/0279714 A1 | 11/2010 | Chin et al. | |
| 2011/0028085 A1 | 2/2011 | Waun et al. | |
| 2011/0176466 A1 | 7/2011 | Lindoff et al. | |
| 2011/0261739 A1 | 10/2011 | Fong et al. | |
| 2012/0026992 A1 | 2/2012 | Navda et al. | |
| 2012/0066526 A1 | 3/2012 | Salsbery et al. | |
| 2012/0076011 A1* | 3/2012 | Gobriel | H04W 52/0258 370/252 |
| 2012/0106381 A1 | 5/2012 | Vedantham et al. | |
| 2012/0114331 A1 | 5/2012 | Kamijo et al. | |
| 2012/0269106 A1 | 10/2012 | Tanach | |
| 2013/0242781 A1 | 9/2013 | Hui et al. | |
| 2013/0315092 A1 | 11/2013 | Yu et al. | |
| 2013/0329576 A1 | 12/2013 | Sinha | |
| 2014/0080534 A1 | 3/2014 | Farhadi et al. | |

OTHER PUBLICATIONS

"Android WebKit package and WebView class," retrieved on Oct. 25, 2012, at <<http://web.archive.org/web/20121025152504/http://developer.android.com/reference/android/webkit/package-summary.html>>, 2 pages.

"Broadcom, BCM4329." retrieved on Dec. 27, 2011, at <<http://web.archive.org/web/20111227063228/http://www.broadcom.com/products/Bluetooth/Bluetooth-RF-Silicon-and-Software-Solutions/BCM4329>>, 1 page.

"MiFi—Wikipedia, the free encyclopedia," retrieved on Jan. 31, 2012, at <<http://web.archive.org/web/20120131173813/http://en.wikipedia.org/wiki/MiFi>>, 5 pages.

"MyWi and MyWi OnDemand," retrieved on Dec. 11, 2012, at <<http://web.archive.org/web/20121002055336/http://intelliborn.com/mywi.html>>, 1 page.

"Network Driver Interface Specification (NDIS)," Retrieved on Apr. 21, 2012, at <<http://web.archive.org/web/20120421091139/http://msdn.microsoft.com/en-us/library/ff559102.aspx>>, 1 page.

"Tcpdump & Libpcap Public Repository Tcpdump." Retrieved on Nov. 2, 2012, at <<http://web.archive.org/web/20111102202028/http://www.tcpdump.org/>>, 3 pages.

"The Android Market," Retrieved on Nov. 5, 2012, at <<http://web.archive.org/web/20121105162208/https://play.google.com/store>>, 3 pages.

"The MadWifi Project," Retrieved on Nov. 5, 2012, at <<http://web.archive.org/web/20121105104717/http://madwifi-project.org/>>, 3 pages.

Anand, et al., "Self-Tuning Wireless Network Power Management," MobiCom '03, Sep. 14-19, 2003, 14 pages.

Han, et al., "DozyAP: Power-Efficient Wi-Fi Tethering," MobiSys'12, Jun. 25-29, 2012, 14 pages.

Chandra, et al., "Application-specific network management for energy-aware streaming of popular multimedia formats," Proceedings of the 2002 USENIX Annual Technical Conference, Jun. 10-15, 2002, 14 pages.

Dam, et al., "An Adaptive Energy-Efficient MAC Protocol for Wireless Sensor Networks," Sensys, Nov. 5, 2003, 10 pages.

Dogar, et al., "Catnap: Exploiting High Bandwidth Wireless Interfaces to Save Energy for Mobile Devices," MobiSys' 10, Jun. 15-18, 2010, 16 pages.

Garg, et al., "MAC Scheduling Policies for Power Optimization in Bluetooth: A Master Driven TDD Wireless System," Vehicular Technology Conference Proceedings, VTC 2000—Spring Tokyo, 2000 IEEE 51st. May 15-18, 2000, vol. 1, pp. 196-200, 5 pages.

Krashinsky, et al., "Minimizing energy for wireless web access with bounded slowdown," MobiCom '02, Sep. 23-28, 2002, 12 pages.

Likamwa, et al., "Can Your Smartphone Infer Your Mood?" PhoneSense Workshop @ Sensys, Seattle, Washington, 2011, 5 pages.

Manweiler, et al., "Avoiding the Rush Hours: WiFi Energy Management via Traffic Isolation," MobiSys'11, Jun. 28-Jul. 1, 2011, 14 pages.

Poellabauer, et al., "Energy-aware traffic shaping for wireless real-time applications," RTAS, May 25-28, 2004, 8 pages.

Qiao, et al., "Smart Power-Saving Mode for IEEE 802.11 Wireless LANs," iINFOCOM 2005. 24th Annual Joint Conference of the IEEE Computer and Communications Societies. Proceedings IEEE, vol. 3, Mar. 13-17, 2005, pp. 1573-1583, 11 pages.

Rozner, et al., "NAPman: Network-Assisted Power Management for WiFi Devices," MobiSys'10, Jun. 15-18, 2010, 15 pages.

Wirtz, et al., "Establishing Mobile Ad-Hoc Networks in 802.11 Infrastructure Mode," Proceedings of the 6th ACM Workshop on Challenged Networks, Sep. 19, 2011, pp. 49-52, 4 pages.

Wu et al., "Optimal Sleep/Wake Scheduling for Time-Synchronized Sensor Networks with QoS Guarantees," IEEE/ACM Transactions on Networking, vol. 17, Issue 5, Jun. 30, 2009, pp. 1508-1521, 13 pages.

Chang, Yu-Chu, "Power Saving Access Points for IEEE 802.11 Wireless Network Infrastructure," IEEE Transactions on Mobile Computing, vol. 5, No. 2, Feb. 2006, 25 pages.

Sharma et al., "Cool-teather: Energy Efficient On-the-fly Wi-Fi Hotspots using Mobile Phones" CoNEXT '09 Proceedings of the 5th International Conference on Emerging Networking Experiments and Technologies, Dec. 2, 2009, pp. 109-120, 12 pages.

Bertozzi et al., "Power Aware Network Interface Management for Streaming Multimedia" IEEE WCNC, vol. 2, Mar. 2002, pp. 926-930, 5 pages.

He et al., "A Novel Scheduled Power Saving Mechanism for 802.11 Wireless LANs" IEEE Transactions on Mobile Computing, vol. 8, No. 11, Oct. 2009, pp. 1368-1383, 16 pages.

Li et al., "Access Point Power Saving in Solar/Battery Powered IEEE 802.11 ESS Mesh Networks" IEEE QShine, Aug. 22-24, 2005, 5 pages.

Lin et al., "An Adaptive Sniff Scheduling Scheme for Power Saving in Bluetooth" IEEE Wireless Communications, vol. 9, Issue 6, Dec. 2002, pp. 92-103, 12 pages.

Liu et al., "Micro Power Management of Active 802.11 Interfaces" MobiSys. Jun. 17-20, 2008, 14 pages.

Lu et al., "Delay Efficient Sleep Scheduling in Wireless Sensor Networks" INFOCOM 2005. 24th Annual Joint Conference of the IEEE Computer and Communications Societies, Proceedings IEEE, vol. 4. Mar. 13-17, 2005, 12 pages.

Non-Final Office Action dated Apr. 29, 2014 from U.S. Appl. No. 13/669,653, 43 pages.

Applicant-Initiated Interview Summary dated Jul. 8, 2014 from U.S. Appl. No. 13/669,653, 3 pages.

Response filed Aug. 20, 2014 to Non-Final Office Action dated Apr. 29, 2014 from U.S. Appl. No. 13/669,653, 21 page.

Final Office Action datef Dec. 4, 2014 from U.S. Appl. No. 13/669,653, 70 pages.

Applicant Initiated Interview Summary dated Apr. 2, 2015 from U.S. Appl. No. 13/669,653, 3 pages.

Response filed Apr. 15, 2015 to Final Office Action dated Dec. 4, 2014 from U.S. Appl. No. 13/669,653, 17 pages.

Notice of Allowance dated Sep. 15, 2015 from U.S. Appl. No. 13/669,653, 14 pages.

Trifunovic et al., "WiFi-Opp: Ad-Hoc-less Opportunistic Networking", Proceedings of the 6th ACM workshop on Challenged networks, Sep. 9, 2011, 6 pages.

Min et al., "Improving Energy Efficiency for Mobile Platforms by Exploiting Low-Power Sleep States", Proceedings of the 9th Conference on Computing Frontiers, May 15, 2012, 10 pages.

Keshav et al., "Energy Efficient Scheduling in 4G Smart Phones for Mobile Hotspot Application", National Conference on Communications, Feb. 3, 2012, 5 pages.

Huang et al., "Anatomizing Application Performance Differences on Smartphones", Proceedings of the 8th International Conference on Mobile Systems, Applications, and Services, Jun. 15, 2010, 13 pages.

"Wireless LAN Medium Access Control (MAC) and Physical Layer (PHY) Specifications", IEEE Std 802.11, Jun. 12, 2007, 1232 pages.

"MyWi 5.0", Retrieved on Jul. 16, 2012, at <<http://intelliborn.com/mywi.html>>, 1 page.

"Monsoon Power Monitor", Retrieved on Jul. 16, 2012, at <<http://www.msoon.com/LabEquipment/PowerMonitor>>, 2 pages.

(56) References Cited

OTHER PUBLICATIONS

"Microsoft Researchers Demo Power-Saving System for Wi-Fi Tethering", Published by Incisive Financial Publishing Limited, Jun. 27, 2012, retrieved on Jul. 16, 2012, at <<http://www.v3.co.uk/v3-uk/the-frontline-blog/2187267/microsoft-researchers-demo-power-saving-wi-tethering>>, 3 pages.

* cited by examiner

| HEADER | TYPE 0x1 (SLEEP REQUEST) | SEQUENCE NUMBER | SLEEP DURATION |

FIG. 4A

| HEADER | TYPE 0x2 (SLEEP RESPONSE) | SEQUENCE NUMBER | SLEEP DURATION |

FIG. 4B

POWER SAVING WI-FI TETHERING

BACKGROUND

Wi-Fi tethering, which may also be referred to as a mobile hotspot, allows a mobile device to establish an Internet connection via a network interface and then share the Internet connection with other mobile devices via a Wi-Fi interface. For example, a Wi-Fi tethering device may connect to the Internet and then act as a mobile software access point (SoftAP) for the other devices located within a threshold distance from the Wi-Fi tethering device. The Wi-Fi tethering device may route data packets between the network interface and its Wi-Fi interface so that the other devices may use the Internet connection.

Wi-Fi tethering is desirable because it allows multiple devices to share one data plan with a service provider (e.g., a user pays for one device to have the capability to access the network and an Internet connection). Accordingly, the user(s) of the other devices do not have to establish and pay for a dedicated data plan for each of the other devices. Furthermore, Wi-Fi tethering may leverage mobile telephone data networks, which provide ubiquitous access to a network connection. Thus, a device without a dedicated data plan (e.g., mobile telephone network subscription) is able to access an Internet connection via the Wi-Fi tethering device that has a data plan in an area where no other Internet connections are available to the other device.

However, operating a mobile hotspot via Wi-Fi tethering significantly increases the power consumption of the Wi-Fi tethering device, and thereby reduces operation time when the Wi-Fi tethering device is powered by a battery. For example, when the Wi-Fi tethering device operates as a SoftAP and shares an Internet connection, the Wi-Fi interface of the Wi-Fi tethering device is always in a high power consumption state even when the Wi-Fi tethering device is not exchanging data packets with or routing data packets to the other devices (e.g., there is no data traffic being communicated through the Wi-Fi tethering device). This greatly reduces the energy stored in a power supply (e.g., battery) of the Wi-Fi tethering device.

Conventional approaches to saving power on a Wi-Fi tethering device may automatically turn off the Wi-Fi tethering interface of a Wi-Fi tethering device after it has been inactive for a period of several minutes. Moreover, the conventional approaches require a user to manually re-establish a Wi-Fi connection after the Wi-Fi tethering interface of the Wi-Fi tethering device is turned off, which results in a poor user experience.

SUMMARY

The techniques discussed herein reduce the power consumption of a Wi-Fi tethering device by switching the Wi-Fi functionality of the Wi-Fi tethering device from a normal operational mode to a sleep mode during idle intervals. The techniques implement a sleep protocol where a Wi-Fi tethering device and a Wi-Fi client device coordinate and establish a sleep schedule. Moreover, the techniques describe a sleep interval adaptation algorithm to establish sleep duration intervals for the sleep schedule. The sleep interval adaptation algorithm may be configured to determine the sleep duration intervals based at least on data packet exchange patterns associated with different applications executing on the Wi-Fi client device and/or different operations being performed by the Wi-Fi client device. Using the techniques described herein, the Wi-Fi tethering device and/or the Wi-Fi client device are able reduce a power consumption rate of their respective power supplies when sharing an Internet connection via Wi-Fi interfaces.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

FIG. 4A illustrates an example sleep request data packet, in accordance with various embodiments described herein.

FIG. 4B illustrates an example sleep response data packet, in accordance with various embodiments described herein.

DETAILED DESCRIPTION

Overview

Figure 1:
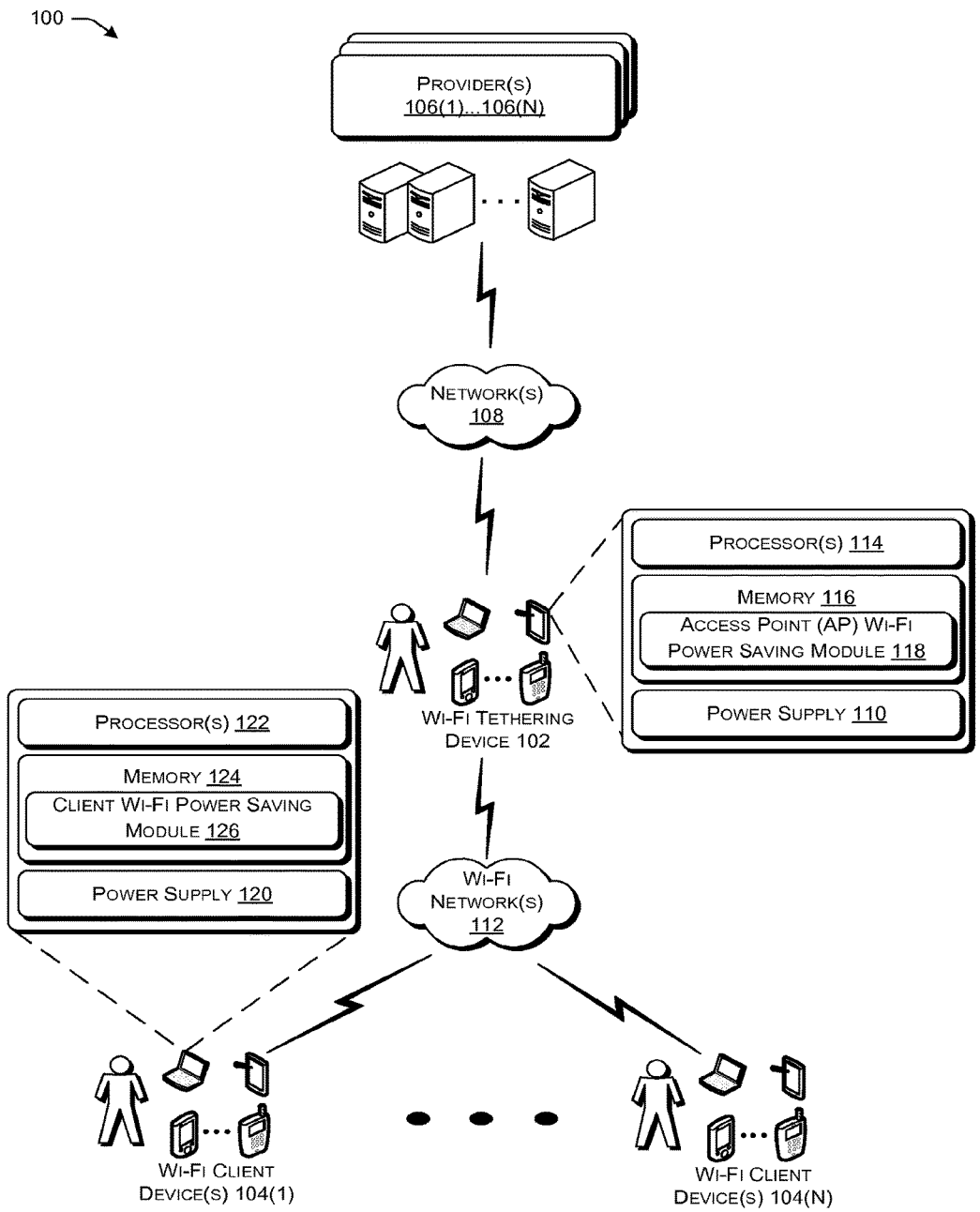
FIG. 1 illustrates an example overview of the techniques discussed herein.

The following description sets forth techniques to reduce power consumption of a Wi-Fi tethering device by switching a Wi-Fi interface of the Wi-Fi tethering device to a sleep mode to save power. In order to switch the Wi-Fi interface of the Wi-Fi tethering device to sleep mode, the techniques implement a sleep protocol during which the Wi-Fi tethering device sends a sleep request to the Wi-Fi client device and the Wi-Fi client device responds with a sleep response to establish a sleep schedule and/or sleep duration intervals (i.e., the devices agree upon a sleep schedule). The techniques further describe a sleep interval adaptation algorithm that determines and defines the sleep duration intervals based on data packet exchange (e.g. traffic) patterns between the Wi-Fi tethering device and the Wi-Fi client device. In various embodiments, the data packet exchange patterns relate to a content fetching phase and/or a content consuming phase for the Wi-Fi client device, as further discussed herein.

The sleep protocol discussed herein helps alleviate instances of packet loss during data packet exchange because the Wi-Fi tethering device and the Wi-Fi client device communicate and agree upon the sleep schedule. Accordingly, the Wi-Fi client device is aware that the Wi-Fi tethering device is in a sleep mode (e.g., power saving mode). Thus, the Wi-Fi client device may buffer data packets during the sleep mode instead of transmitting them to the Wi-Fi tethering device, which potentially leads to packet loss (e.g., when the Wi-Fi client device assumes the Wi-Fi tethering device is available to receive packets, but it may not be available because the Wi-Fi interface of the Wi-Fi tethering device is turned off).

The sleep interval adaptation algorithm discussed herein may prevent an increase in network latency by determining a sleep duration interval based on data packet exchange patterns. Accordingly, the Wi-Fi interface of the Wi-Fi tethering device may be turned on (e.g., woken up) when data packets are expected to be received from and/or transmitted to the Wi-Fi client device in accordance with an application executing on the Wi-Fi client device and/or operations being performed by the Wi-Fi client device.

The aforementioned conventional approaches to saving power on a Wi-Fi tethering device may automatically turn off the Wi-Fi tethering interface of the Wi-Fi tethering device when the Wi-Fi network is inactive for a time threshold of several minutes (e.g., when there is no Wi-Fi data packet exchange for several minutes). However, this conventional time threshold is too long and fails to account for idle intervals that are less than several minutes (e.g., less than three minutes). Thus, a Wi-Fi tethering device configured to save power using the conventional approaches continues to operate in a high power consumption state (e.g., several minutes) even when there may not be any data packet exchanges. Moreover, the conventional approaches often result in a poor user experience at least because a user has to manually re-enable and/or re-establish the Wi-Fi connection. For example, once a Wi-Fi client device has already downloaded content for a long news article (e.g., a content fetching phase as further discussed herein), the Wi-Fi tethering interface may turn off after several minutes while a user of the Wi-Fi client device is reading the long news article (e.g., a content consuming phase as further discussed herein). Consequently, when the user clicks on another link to download another news article, he/she may have to re-enable the Wi-Fi connection after it is turned off.

Furthermore, the conventional approaches may also use periodic time synchronization to align timing clocks which help coordinate automatically turning off the Wi-Fi tethering interface of the Wi-Fi tethering device when the Wi-Fi network is inactive for a time threshold of several minutes. However, the conventional time synchronization approaches still use a high level of power consumption at least because the periodic time synchronization requires a large amount of energy.

In contrast to the conventional approaches, the techniques discussed herein take advantage of sleeping opportunities (e.g., idle times) that are less than several minutes (e.g., less than three minutes). The techniques identify the idle times for a Wi-Fi interface of a Wi-Fi tethering device and switch the Wi-Fi interface of the Wi-Fi tethering device to a sleep mode during these idle times to reduce power consumption. In various embodiments, the techniques determine the idle times in accordance with data packet exchange patterns corresponding to various applications being executed on and/or operations being performed by the Wi-Fi client device. For example, the various applications and/or operations may be associated with news reading applications (e.g., newspaper articles, sports articles, periodicals, research papers, etc.), online book reading applications (e.g., novels, non-fiction books, etc.), video streaming applications (e.g., short videos, long videos, news clips, sports highlights, etc.), Internet or World Wide Web search applications, maps and/or directions applications, electronic mail (email) applications, Rich Site Summary (RSS) reader applications, social network applications, gaming applications, communication applications, or any other application and/or functionality often performed by mobile devices. The various applications may behave differently on different Wi-Fi tethering devices (e.g., different operating systems, different network interfaces, compatibility restrictions, display space, etc.). Moreover, measurements associated with packet inter-arrival intervals for these various applications show that the Wi-Fi network and the Wi-Fi interface of a Wi-Fi tethering device may be idle up to 90% of a total amount of time that one or more of the various applications are being executed on the Wi-Fi client device. Accordingly, actual data packet exchange between the Wi-Fi tethering device and the Wi-Fi client device is sparse and may occur in concentrated areas (e.g., bursts of activity in short segments of time), thereby providing opportune idle intervals.

Thus, the techniques discussed herein take advantage of the idle intervals (e.g., less than several minutes) to reduce the power consumption rate of the Wi-Fi tethering device and/or the Wi-Fi client device by switching Wi-Fi interfaces from a normal operational (e.g., active) mode to a sleep mode when the Wi-Fi tethering device identifies one of the idle intervals.

Illustrative Architecture

FIG. 1 shows an illustrative architecture 100 that may employ the described techniques. To this end, architecture 100 includes a Wi-Fi tethering device 102, one or more Wi-Fi client devices 104(1) . . . 104(N), and one or more providers 106(1) . . . 106(N). The Wi-Fi tethering device 102 may be coupled to the one or more providers 106(1) . . . 106(N) via one or more network(s) 108 such that the Wi-Fi tethering device 102 can access, receive and/or download content stored at and/or provided by the one or more providers 106(1) . . . 106(N). Accordingly, the one or more providers 106(1) . . . 106(N) may be a collection of server devices associated with service providers (e.g., Internet access provider, mobile telephone network provider, virtual private network (VPN), etc.) and/or content providers (e.g., web content servers, file servers, etc.). Moreover, providers 106(1) . . . 106(N) may be implemented in a distributed computing environment (e.g., cloud services, etc.) or in a non-distributed computing environment (e.g., a server farm, etc.).

In various embodiments, the network(s) 108 may include a mobile telephone network (MTN) (e.g., 3G, 4G), a local area network ("LAN"), a larger network such as a wide area network ("WAN"), and/or any other networking or communication technology capable of permitting the Wi-Fi tethering device 102 to retrieve content stored on and/or provided by the one or more providers 106(1) . . . 106(N). Moreover, the network(s) 108 may be wired, wireless, or a combination thereof.

In various embodiments, the Wi-Fi tethering device 102 is a mobile device that may be powered by a battery or other power supply 110 (e.g., an expendable power supply). For example, the mobile device may be a laptop computer, a mobile telephone, a smart phone, a personal digital assistant (PDA), a tablet device, a media player, a gaming device, or any other computing device that can connect to network(s)

108 and share access to network(s) 108 with the one or more Wi-Fi client devices 104(1) ... 104(N) via a Wi-Fi network 112 (e.g., a Wi-Fi connection). In at least one embodiment, the Wi-Fi tethering device 102 may also be a desktop computer or other stationary device.

In various embodiments, the Wi-Fi tethering device 102 comprises one or more processor(s) 114 and a memory 116. Furthermore, the Wi-Fi tethering device 102 may include an access point (AP) Wi-Fi power saving module 118. As discussed herein, the access point Wi-Fi power saving module 118 is configured to manage and control the power supply 110 by coordinating a sleep schedule that will reduce the power consumption rate of the Wi-Fi tethering device. Therefore, the AP Wi-Fi power saving module 118 helps preserve the life of the power supply 110.

The processor(s) 114 may be a single processing unit or a number of units, all of which could include multiple computing units. The processor(s) 114 may be implemented as one or more microprocessors, microcomputers, microcontrollers, digital signal processors, central processing units, state machines, logic circuitries, shared-memory processors, and/or any devices that manipulate signals based on operational instructions. Among other capabilities, the processor(s) 114 may be configured to fetch and execute computer-readable instructions stored in the depicted modules and/or memory 116.

The memory 116 (and other memory described herein) may comprise computer-readable media including, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing or server device.

In contrast, communication media may embody computer readable instructions, data structures, program modules, or other data in a modulated data signal, such as a carrier wave, or other transmission mechanism. As defined herein, computer storage media does not include communication media.

In various embodiments, the one or more Wi-Fi client devices 104(1) ... 104(N) may also be a mobile device that may be powered by a battery or other power supply 120. For example, the mobile device may be a laptop computer, a mobile telephone, a smart phone, a PDA, a tablet device, a media player, a gaming device, an image recording device, or any other computing device that can connect to the Wi-Fi tethering device 102 via the Wi-Fi network 112. In at least one embodiment, the Wi-Fi client devices 104(1) ... 104(N) may also be a desktop computer. Moreover, each of the Wi-Fi client devices 104(1) ... 104(N) may also include one or more processors 122 and a memory 124. The one or more processors 122 and the memory 124 may be the same as, or similar to, the processors 114 and memory 116 discussed above with respect to the Wi-Fi tethering device 102.

In various embodiments, each of the Wi-Fi client devices 104(1) ... 104(N) may include a client Wi-Fi power saving module 126 that communicates with the AP Wi-Fi power saving module 118 on the Wi-Fi tethering device 102 to coordinate and establish the sleep schedule. Each of the modules is discussed in greater detail below.

Figure 2:
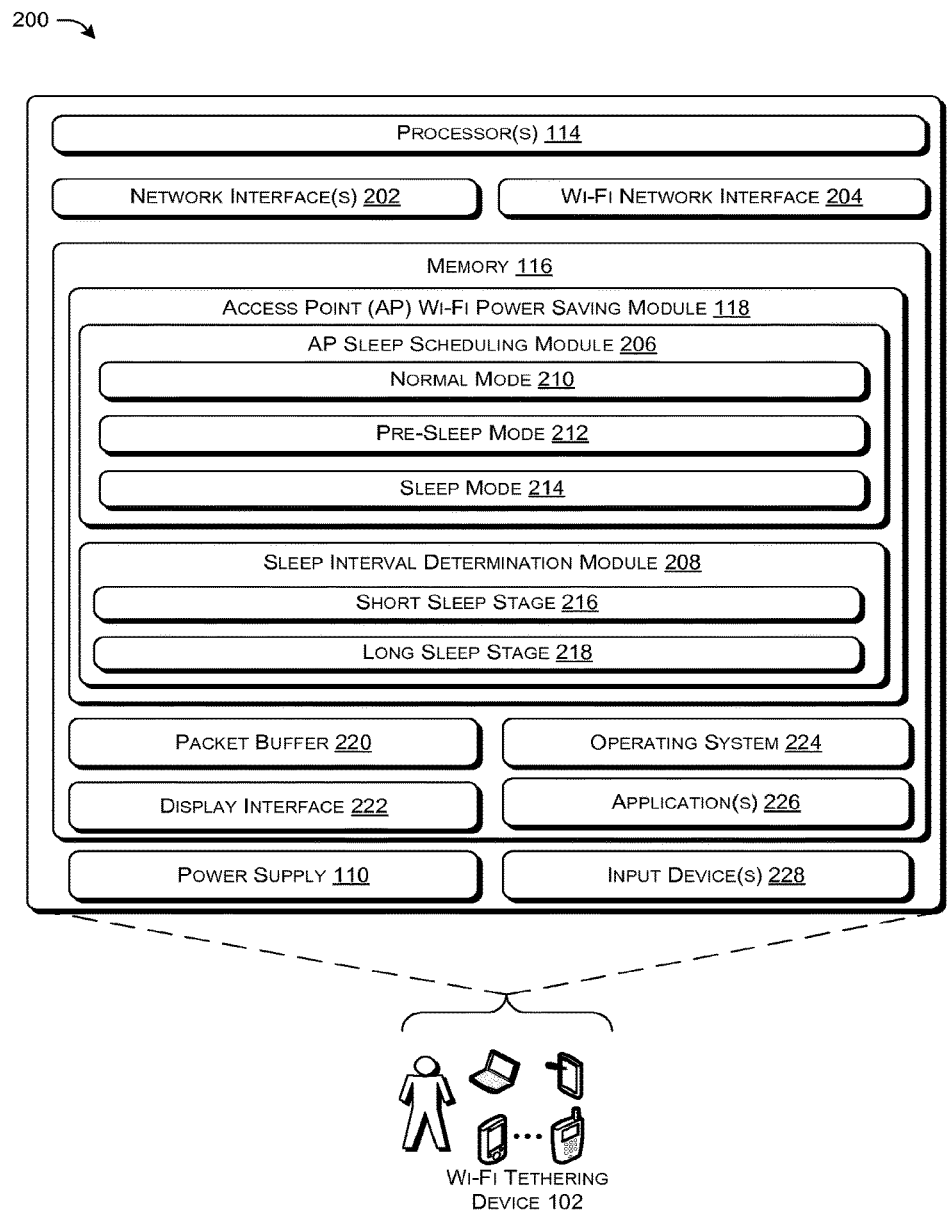
FIG. 2 illustrates example device architecture for implementing the Wi-Fi tethering device, in accordance with various embodiments described herein.

FIG. 2 illustrates an example computing architecture 200 of various components included in the example Wi-Fi tethering device 102 of FIG. 1. In various embodiments, the Wi-Fi tethering device 102 includes network interface(s) 202 and a Wi-Fi network interface 204. The network interface(s) 202 may include hardware and/or software configured to connect the Wi-Fi tethering device 102 to the network(s) 108 so that the Wi-Fi tethering device can access, request, receive, and/or download content provided by and stored at the providers 106(1) ... 106(N). The network interface(s) 202 can facilitate communications within a wide variety of networks and protocol types, including wireless networks (e.g., WLAN, MTN, satellite, etc.) and/or wired networks (e.g. LAN, cable, etc.). For example, the network interface 202 may be a 3G interface, a 4G interface, or another mobile communication interface.

The Wi-Fi network interface 204 may include hardware and/or software configured to establish the Wi-Fi network(s) 112 (e.g., Wi-Fi connection) which permit the Wi-Fi tethering device 102 to share a connection to providers 106(1) ... 106(N) via the network(s) 108 using the network interface(s) 202. Thus, the Wi-Fi tethering device 102 may act as a mobile software access point (SoftAP) for the Wi-Fi client devices 104(1) ... 104(N). In various embodiments, the hardware and/or software may include routers, drivers, controllers, or a combination thereof.

In various embodiments, the AP Wi-Fi power saving module 118 may include an access point (AP) sleep scheduling module 206 and a sleep interval determination module 208. The AP sleep scheduling module 206 may be configured to coordinate a sleep schedule for the Wi-Fi network interface 204 of the Wi-Fi tethering device 102. Accordingly, in various embodiments, the AP sleep scheduling module 206 may be in a normal mode 210, a pre-sleep mode 212, and a sleep mode 214 (e.g., three "soft" states for the AP Wi-Fi power saving module 118 of the Wi-Fi tethering device 102), and may manage the Wi-Fi network interface 204 by switching the Wi-Fi network interface 204 between a normal state of communication and a sleep state (e.g., two "hard" states for the Wi-Fi network interface 204 of the Wi-Fi tethering device 102).

In various embodiments, the normal mode 210 of the AP sleep scheduling module 206 may be an operational mode where the Wi-Fi tethering device 102, via the Wi-Fi network interface 204 being in a normal state, is active and may transmit and/or receive data packets (e.g., exchange data packets) with the Wi-Fi client device 104 in a normal manner. Data packets exchanged when the AP sleep scheduling module 206 is in the normal mode of Wi-Fi communication may be referred to as "normal" data packets (e.g., content request packets, content downloading packets, etc.). The pre-sleep mode 212 of the AP sleep scheduling module 206 may also be an operational mode where the Wi-Fi tethering device 102, via the Wi-Fi network interface 204 being in a normal state, remains active and may still transmit and/or receive data packets with the Wi-Fi client device 104. However, the AP sleep scheduling module 206 enters the pre-sleep mode 212 after a sleep request packet is sent to the Wi-Fi client device 104 and while the AP sleep scheduling module 206 is waiting for a sleep response packet from the Wi-Fi client device 104. Accordingly, the Wi-Fi network interface 204 may be in the normal "hard" state of communication when the AP sleep scheduling module 206 is in normal mode 210 and pre-sleep mode 212, and the Wi-Fi interface 204 may be in a sleep "hard" state when the AP sleep scheduling module 206 is in sleep mode 214.

In various embodiments, the sleep mode 214 may be a non-operational mode of the sleep protocol where the AP sleep scheduling module 206 turns off the Wi-Fi network interface 204 of the Wi-Fi tethering device 102 to save power for the power supply 110. The AP sleep scheduling module 206 may turn off the Wi-Fi network interface 204 after a valid sleep response packet is received from the Wi-Fi client device 104 while the AP sleep scheduling module 206 is in the pre-sleep mode 212, as further discussed herein. In various embodiments, the sleep mode 214 may be a non-operational state where the AP sleep scheduling module 206 completely shuts down the Wi-Fi interface 204 (e.g., no communication in the sleep state). In an alternative embodiment, the sleep mode 214 may be a reduced power operational state where the AP sleep scheduling module 206 does not completely shut down the Wi-Fi network interface 204, but rather, restricts or limits the Wi-Fi functionality (e.g., limited communications in the sleep state).

In various embodiments, the sleep interval determination module 208 determines and/or defines a sleep duration interval that is communicated to the Wi-Fi client device 104 (e.g., in a sleep request packet) so that the Wi-Fi client device 104 can agree upon the sleep schedule. The sleep schedule may include one or more sleep slots, as further discussed herein. The sleep interval determination module 208 may determine that the sleep duration interval be set in accordance with a short sleep stage 216 or a long sleep stage 218. The sleep interval determination module 208 may determine that the sleep duration be set in accordance with a short sleep stage 216 or a long sleep stage 218 based on a determination or implication that an application executing on the Wi-Fi client device 104 may be in a content fetching phase or a content consuming phase.

For instance, the content fetching phase occurs when a user of the Wi-Fi client device 104 requests and downloads, via the Wi-Fi network 112, content from a provider 106(N) (e.g., a remote Web server). The content consuming phase occurs while the user of the Wi-Fi client device 104 spends time to consume the content after it has been downloaded (e.g., read the text, watch video, listen to audio, read/write an email, etc.). Accordingly, the time that a user takes to consume the content in the content consuming phase may vary from a few seconds to tens of seconds, and up to longer periods of times (e.g., multiple minutes or even an hour when reading a book). The content consuming phase may depend on the application being executed on the Wi-Fi client device 104 and/or the functionality being performed by the user of the Wi-Fi client device 104. During the content consuming phase, data packet exchange with the Wi-Fi tethering device 102 may not be necessary, and therefore, the Wi-Fi network 112 may be mostly idle.

In various embodiments, idle times for the Wi-Fi network interface 204 may also result because the bandwidth available to a network connection (e.g., network(s) 108) may be lower when compared to the bandwidth available to a Wi-Fi network connection (e.g., Wi-Fi network 112). For example, the bandwidth of a 3G network connection for a smart phone is much lower than that of a Wi-Fi connection for the smart phone. Thus, the round trip times (RTTs) associated with content access/retrieval for the 3G network connection are larger when compared to the Wi-Fi network connection. A RTT is the amount of time that a device has to wait for a first response packet after sending a content request packet. For example, the RTT may include time associated with a Domain Name Server (DNS) lookup and/or time associated with making a transmission control protocol (TCP) connection to the content server. Consequently, the Wi-Fi interface 204 of the Wi-Fi tethering device 102 often has to wait for data to be received from and/or transmitted over the 3G network connection. This waiting may result in additional idle times for the Wi-Fi interface 204.

In various embodiments, the memory 116 of the Wi-Fi tethering device 102 may also include the power supply 110, a packet buffer 220, a display interface 222, an operating system (OS) 224 (e.g., different OSs based on the manufacturer of the Wi-Fi tethering device 102), one or more applications 226 (e.g., news reading applications, online book reading applications, video streaming applications, searching applications, email applications, maps and directions applications, RSS reader applications, browsers, gaming applications, music applications, imaging applications, etc.). Additionally, the Wi-Fi tethering device may also include the power supply 110 and one or more input device(s) 228.

In various embodiments, the display interface 222 may be any type of display interface known in the technical field. Moreover, the one or more input device(s) 228 may include any type of input associated with mobile devices (e.g., touch input, keypad input, keyboard input, audio input, and so forth).

In various embodiments, the packet buffer 220 may store normal data packets that arrive or are received while the Wi-Fi tethering device 102 is in sleep mode and/or the Wi-Fi network interface 204 is in a sleep state, as further discussed herein.

Figure 3:
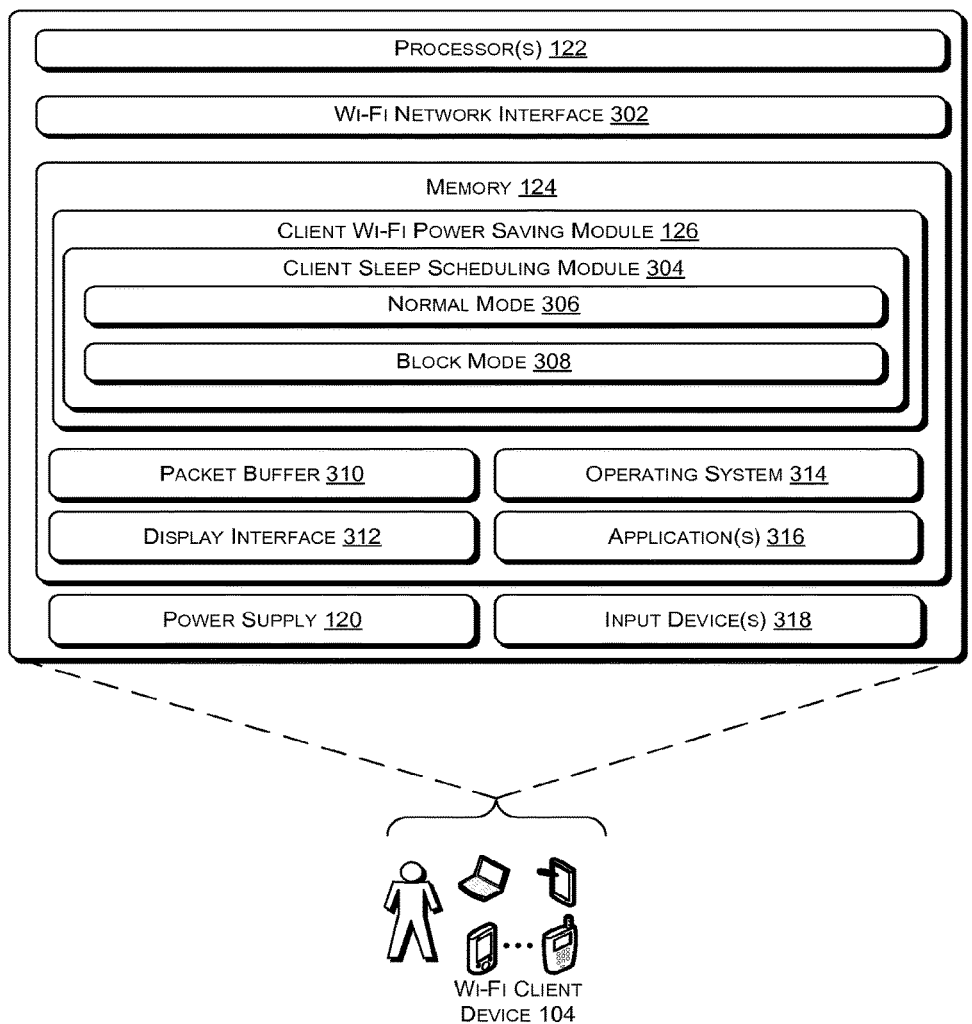
FIG. 3 illustrates example device architecture for implementing the Wi-Fi client device, in accordance with various embodiments described herein.

FIG. 3 illustrates an example computing architecture 300 of various components included in the example Wi-Fi client device 104 of FIG. 1. In various embodiments, the Wi-Fi client device 104 includes a Wi-Fi network interface 302. The Wi-Fi client device 104 may also include other network interfaces that may be used independent of the Wi-Fi network interface 302. These network interfaces may be the same as, or similar to, the network interfaces 202 of the Wi-Fi tethering device 102. The Wi-Fi network interface 302 may include hardware and/or software configured to establish the Wi-Fi network(s) 112 (e.g., Wi-Fi connection) which permit the Wi-Fi client device 104 to access, as a beneficiary, a shared connection to providers 106(1) . . . 106(N) via the network(s) 108. The shared connection may be accessed via the Wi-Fi tethering device 102, as discussed above.

In various embodiments, the client Wi-Fi power saving module 126 may include a client sleep scheduling module 304. The client sleep scheduling module 304 may be configured to communicate with the AP sleep scheduling module 206 so that the AP sleep scheduling module 206 can coordinate a sleep schedule for Wi-Fi network interface 204 of the Wi-Fi tethering device 102, as discussed above and further discussed herein. Accordingly, in various embodiments, the client sleep scheduling module 304 may help the AP sleep scheduling module 206 coordinate a sleep schedule for Wi-Fi network interface 204 by implementing and/or communicating a normal mode 306 and/or a block mode 308 for Wi-Fi communication. The normal mode 306 is a counterpart operational mode to the normal mode 210 and/or the pre-sleep mode 212 of the Wi-Fi tethering device 102, where the Wi-Fi interface 302 of the Wi-Fi client device 104 is active and may transmit and/or receive data packets with the Wi-Fi tethering device 102 in a normal manner.

In various embodiments, the block mode 308 is a mode of the sleep protocol where the client Wi-Fi power saving module 126 blocks the data packet transmissions of the Wi-Fi client device 104. Moreover, in the block mode 308, the Wi-Fi client device 104 knows that the Wi-Fi network interface 204 of the Wi-Fi tethering device 102 is also sleeping (i.e., in the sleep state). In various embodiments, the Wi-Fi client device 104 may configure the block mode 308 in association with power saving standards defined in IEEE 802.11 for Wi-Fi clients such as "PM_Max" or "PM_Fast".

In various embodiments, the memory 124 of Wi-Fi client device 104 may also include a packet buffer 310, a display interface 312, an OS 314, and one or more applications 316 (i.e., the same or similar applications discussed above). Moreover, the Wi-Fi client device 104 may also include the power supply 120 and one or more input device(s) 318.

The display interface 312 and/or the one or more input devices 318 of the Wi-Fi client device 104 may be the same as, or similar to, the display interface 222 and the one or more input devices 228 of the Wi-Fi tethering device 102, as discussed above.

In various embodiments, the client Wi-Fi power saving module 126 may be implemented as a loadable module FIGS. 4A and 4B illustrate example sleep protocol packets exchanged between the Wi-Fi tethering device 102 and the Wi-Fi client device 104. FIG. 4A is directed to an example sleep request packet sent by the Wi-Fi tethering device 102 to the Wi-Fi client device 104. FIG. 4B is directed to an example sleep response packet sent by the Wi-Fi client device 104 to the Wi-Fi tethering device 102 after receiving the sleep request packet.

In various embodiments, both the sleep request packet and the sleep response packet may be transmitted as a Wi-Fi unicast data packet. The format of a Wi-Fi unicast data packet may include a header (e.g., 802.11 header) and three fields. The "Type" field indicates the packet type. For example, in FIG. 4A "0x1" may indicate a sleep request packet. In FIG. 4B, "0x2" may indicate a sleep response packet. The "Sequence Number" field may be a unique identifier (ID) that identifies a sequential sleep request-sleep response pair. The "Sequence Number" field may start at zero and increase by one for each new sleep request transmitted by the Wi-Fi tethering device 102 to the Wi-Fi client device 104. The "Sleep Duration" field specifies an amount of time (e.g., in milliseconds or other timing metric) that the AP sleep scheduling module 206 of the Wi-Fi tethering device 102 requests to place the Wi-Fi network interface 204 into the sleep state. The client sleep scheduling module 304 may also switch from normal mode 306 to block mode 308 based on the sleep duration information communicated in the sleep request packet and the sleep response packet.

In various embodiments, the sleep duration may be a fixed period of time based on a timing value defined in an adaptive algorithm or an adaptive period of time determined and provided by the adaptive algorithm, as further discussed herein.

In various embodiments, the sequence numbers and sleep durations are decided and communicated by the Wi-Fi tethering device 102 that is operating as a SoftAP. If the Wi-Fi client device 104 decides to accept a sleep request communicated by the Wi-Fi tethering device 102, then the Wi-Fi client device 104 may copy the sequence number and the sleep duration from the sleep request packet and include the same sequence number and the same sleep duration in the sleep response packet to show agreement to the proposed sleep schedule. In various embodiments, the client sleep scheduling module 304 of the Wi-Fi client device 104 may only send a sleep response packet when it wants to accept the sleep request. If the Wi-Fi client device 104 does not want to agree to the sleep request (e.g., the Wi-Fi client device 104 does not want the Wi-Fi tethering device 102 to turn off the Wi-Fi network interface 204 because, for example, it has normal data packets to transmit to the Wi-Fi tethering device 102), then the Wi-Fi client device 104 may choose to not send a sleep response packet.

Accordingly, in various embodiments, the AP sleep scheduling module 206 may only be able to switch from normal mode 210, to pre-sleep mode 212, and then ultimately to sleep mode 214 when the Wi-Fi client device 104 agrees to sleep. In this way, the Wi-Fi client device 104 will know that the Wi-Fi tethering device 102 is sleeping (e.g., the AP sleep scheduling module is in sleep mode 214 and the Wi-Fi network interface 204 is in a sleep state) and potential packet loss will likely be avoided (e.g., a packet communicated while the Wi-Fi tethering device 102 is sleeping).

It is understood in the context of this document, that other protocols and/or formats may be used to communicate sleep requests and sleep responses. Thus, the data packets depicted in FIGS. 4A and 4B are non-limiting examples.

Figure 5:
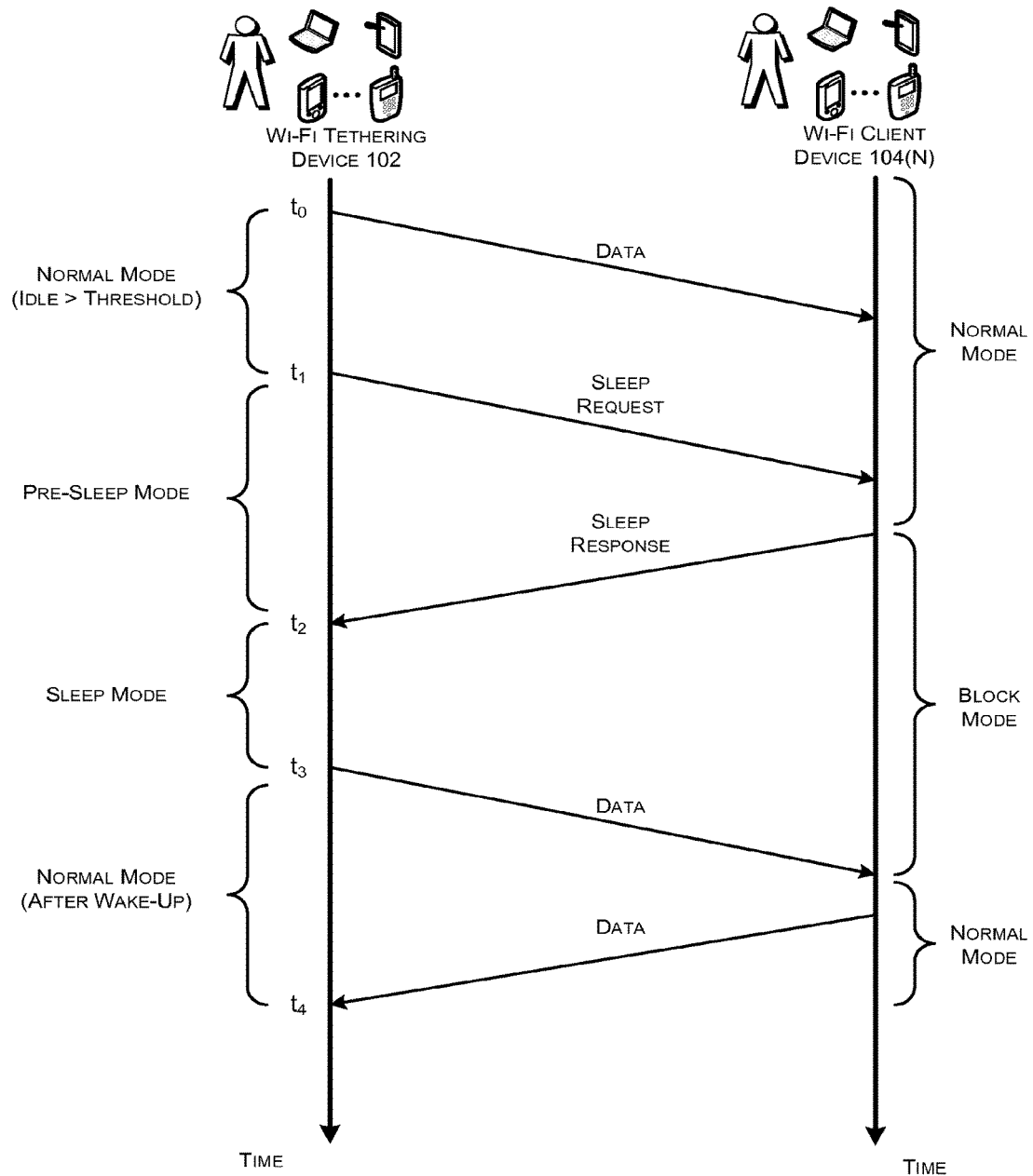
FIG. 5 illustrates an example timing interaction, in accordance with various embodiments described herein.

FIG. 5 illustrates an example timing interaction between the Wi-Fi tethering device 102 and the Wi-Fi client device 104. The example timing interaction begins while the AP sleep scheduling module 206 is in normal mode 210 monitoring data packet exchanges between the Wi-Fi tethering device 102 and the Wi-Fi client device 104. At time $t_0$, the AP sleep scheduling module 206 may identify the start of an idle interval. If the measured idle interval reaches and passes a pre-defined threshold amount of time (e.g., 150 ms), the AP sleep scheduling module 206 configures and sends a sleep request packet (e.g., with a sequence number and sleep duration as depicted in FIG. 4A) to the Wi-Fi client device 104 at time $t_1$. The AP sleep scheduling module 206 of the Wi-Fi tethering device 102 then switches from the normal mode 210 to the pre-sleep mode 212 during which it awaits a sleep response from the Wi-Fi client device 104.

In various embodiments, after receiving the sleep request packet, the Wi-Fi client device 104 decides whether to accept the sleep request or decline the sleep request. If the Wi-Fi client device 104 decides to accept the sleep request, the client sleep scheduling module 304 configures and sends a sleep response packet (e.g., depicted in FIG. 4B) to the Wi-Fi tethering device 102. The client sleep scheduling module 304 may then switch from normal mode 306 to block mode 308. In at least one embodiment, the client sleep scheduling module 304 copies the sequence number and sleep duration from the sleep request packet and includes the same sequence number and the same sleep duration in the sleep response packet.

At time $t_2$, the AP sleep scheduling module 206 receives the sleep response packet from the Wi-Fi client device 104 and may check the sequence number and sleep duration to verify a match. If there is a match, then the Wi-Fi tethering device 102 discerns that the Wi-Fi client device 104 has agreed to sleep, and the AP sleep scheduling module 206 switches from pre-sleep mode 212 to sleep mode 214 and puts the Wi-Fi network interface 204 into the sleep state.

At time $t_3$, the sleep duration interval, or the amount of sleep time, communicated in the sleep request packet expires or passes and the AP sleep scheduling module 206 wakes up or turns on the Wi-Fi interface 204 and operates the Wi-Fi interface 204 in the normal mode 210 until time $t_4$. In various embodiments, the example timing interaction may then repeat itself when another measured idle interval reaches and passes the pre-defined threshold amount of time. In other embodiments, the Wi-Fi tethering device 102 may send another sleep request packet at time $t_3$ when the sleep duration interval expires and the Wi-Fi tethering device 102 has no buffered normal data packets to send to the Wi-Fi client device 104.

Accordingly, in association with these repetitive scenarios, the AP sleep scheduling module 206 of the Wi-Fi tethering device 102 may send a subsequent sleep request packet with a new sequence number (e.g., incremented by one) and another sleep duration that may be the same sleep duration or a different sleep duration determined by the sleep interval determination module 208, as further discussed herein.

In various embodiments, if the Wi-Fi client device 104 decides to decline the sleep request instead of accept the sleep request, then the client sleep scheduling module 304 does not send the sleep response packet. This example scenario may occur when the Wi-Fi client device 104 determines that it has one or more normal data packets to send in the normal mode 306. As discussed above, during the normal mode (e.g., 210 and 306) of Wi-Fi communication the Wi-Fi tethering device 102 and the Wi-Fi client device 104 may exchange data packets associated with content requests/responses and content downloading (e.g., the content fetching phase). Accordingly, instead of sending the sleep response packet, the Wi-Fi client device 104 may send a normal data packet in the normal mode 306 of Wi-Fi communication and the Wi-Fi tethering device 102 learns that the Wi-Fi client device 104 has decided not to switch to the block mode 308 at least because it has data packets to communicate in the normal mode 210 and 306 of Wi-Fi communication. Consequently, instead of switching from the pre-sleep mode 212 to the sleep mode 214, the AP sleep scheduling module 206 may switch from the pre-sleep mode 212 back to the normal mode 210 when a data packet other than a sleep response packet is received in response to sending a sleep request packet. This example scenario of declining the sleep request reduces overhead of the sleep protocol described herein at least because a sleep response packet may only be transmitted when the Wi-Fi client device 104 does not have any normal data packets to transmit in the normal mode 306, and thus, the Wi-Fi client device 104 decides to agree to a sleep schedule (e.g., a sleep duration interval specified in the sleep request packet).

In various embodiments, when the AP sleep scheduling module 206 is in sleep mode 214, the Wi-Fi tethering device 102 may not be configured to receive any normal data packets from the Wi-Fi client device 104 and/or the Wi-Fi tethering device 102 may not be configured to send any normal data packets to the Wi-Fi client device 104. Thus, when the AP sleep scheduling module 206 is in sleep mode 214 and the Wi-Fi tethering device 102 receives normal data packets from the one or more providers 106(1) . . . 106(N) via the network interface(s) 202, the Wi-Fi tethering device 102 may buffer the data packets received from the one or more providers 106(1) . . . 106(N) in the packet buffer 220 during the sleep mode time period. The buffered data packets may then be communicated to the Wi-Fi client device 104 when the AP sleep scheduling module 206 wakes up the Wi-Fi network interface 204 and operates the Wi-Fi network interface 204 in the normal state (e.g., at time $t_3$ in FIG. 5).

In various embodiments, when the client sleep scheduling module 304 is in block mode 308, the Wi-Fi client device 104 may not be configured to transmit any normal data packets to the Wi-Fi tethering device 102. Rather, the Wi-Fi client device 104 buffers normal data packets to be sent in the packet buffer 310. The buffered data packets may be associated with the execution or operation of the OS and/or the one or more applications 316, as discussed above. In at least one embodiment, the client sleep scheduling module 304 of the Wi-Fi client device 104 is configured to switch to the normal mode 306 when the Wi-Fi client device 104 receives a normal data packet from the Wi-Fi tethering device 102 after the AP sleep scheduling module 206 on the Wi-Fi tethering device 102 wakes up the Wi-Fi network interface 204 (as illustrated in the example timing interaction of FIG. 5). In at least one other embodiment, the client sleep scheduling module 304 of the Wi-Fi client device 104 is configured to switch from block mode 308 to normal mode 306 when the agreed upon sleep duration expires.

In various embodiments, if the Wi-Fi client device 104 accepts the sleep request from the Wi-Fi tethering device 102 and agrees to sleep, then the client sleep scheduling module 304 may send a "null data" indication, and then switch to block mode 308 (e.g., sleeping). In at least one embodiment, the client sleep scheduling module 304 may include the "null data" indication in the sleep response packet (e.g., setting a flag in the header). In an alternative embodiment, the client sleep scheduling module 304 may send the "null data" indication as a separate data packet before sending the sleep response packet. The "null data" indication may signal to the Wi-Fi tethering device 102 that the Wi-Fi client device 104 will sleep immediately (e.g., the client sleep scheduling module 304 will switch to a block mode 308), and thus, the Wi-Fi tethering device 102 will know that the Wi-Fi client device 104 is sleeping.

As shown in the example timing interaction of FIG. 5, the sleep protocol discussed herein is able to coordinate and schedule sleeping opportunities for the Wi-Fi tethering device 102 without having to periodically synchronize timing clocks on the Wi-Fi tethering device 102 and the Wi-Fi client device 104. A resulting property of the sleep protocol is that the Wi-Fi client device 104 may deduce that the Wi-Fi tethering device 102 will not be awake while the Wi-Fi client device 104 is sleeping at least because the Wi-Fi tethering device 102 may only sleep when the Wi-Fi client device 104 agrees to sleep (e.g., the Wi-Fi client device 104 will not send a packet when the Wi-Fi network interface 204 on the Wi-Fi tethering device 102 is in the sleep state in accordance with an agreed upon sleeping schedule). This resulting property helps avoid packet loss that may occur when the Wi-Fi client device 104 incorrectly thinks that the Wi-Fi tethering device 102 is awake, but it is actually sleeping.

In various embodiments, the sleep interval determination module 208 determines or defines a sleep duration interval to include in the "Sleep Duration" field in the sleep request packet in FIG. 4A, or any other format for a sleep request. The sleep duration interval may be associated with the short sleep stage 216 or the long sleep stage 218. Moreover, the sleep duration interval may be a pre-defined fixed duration or a variable duration adapted based on a sleep history (e.g., sleep cycles associated with previous idle intervals).

As discussed above, the sleep interval determination module 208 uses the short sleep stage 216 and the long sleep stage 218 to address data packet exchange patterns corresponding to the content fetching phase and the content consuming phase, respectively, of the applications executing on, and the operations being performed by, the Wi-Fi client device 104. Accordingly, the sleep interval determination module 208 may set the sleep duration intervals based on the data packet exchange patterns indicating that the Wi-Fi client device 104 is likely in the content fetching phase or the content consuming phase.

In various embodiments, the sleep duration for the content fetching phase may be a pre-defined sleep duration (e.g., a fixed time period). For example, the pre-defined sleep duration for the content fetching phase may be between 100 ms and 300 ms (e.g., it may be set to 100 ms). The sleep duration for the content consuming phase may also be a pre-defined sleep duration. For example, the pre-defined sleep duration for the content consuming phase may be between 300 ms and one second (e.g., it may be set to 500 ms).

Furthermore, in various embodiments, the sleep interval determination module 208 may determine a sleep duration interval using an adaptive algorithm that iteratively probes and updates an optimal sleep duration for the short sleep stage 216 based on previous sleep cycles and/or idle intervals (e.g., a sleep history). A sleep cycle is a successive collection of continuous sleep slots that are not interrupted by normal data packet exchange. The AP sleep scheduling module 206 sequentially communicates the sleep duration intervals in the sleep request packets based on the sleep slots. For example, the Wi-Fi tethering device 102 may initially place the Wi-Fi network interface 204 to sleep for a sleep duration interval of 300 ms (e.g., a first sleep slot) using the sleep request/sleep response protocol. Then the Wi-Fi tethering device 102 may wake up the Wi-Fi network interface 204 after 300 ms and realize that there are no normal data packets buffered in the packet buffer 220. Therefore, the Wi-Fi tethering device 102 may deduce that there are no normal data packets ready to send to the Wi-Fi client device 104. The Wi-Fi tethering device 102 may then send another sleep request requesting to place the Wi-Fi network interface 204 in a sleep state for another 100 ms (e.g., a second sleep slot). If this sleep request is accepted by the Wi-Fi client device 104, then the sleep cycle would be 400 ms (i.e., combining the first sleep slot and the second sleep slot).

A sleep cycle may include one, two, three, four or however many sleep slots that the devices agree upon before exchanging normal data packets in the normal modes 214 and 306. The sleep slots may be pre-defined time slots or variable time slots (e.g., where the sleep duration interval is adapted in accordance with data packet exchange patterns). The sleep cycle may also vary in a total amount of sleep time also. Of course, in various embodiments, the Wi-Fi client device 104 may not agree to the sleep request when it determines that normal data packets are buffered in the packet buffer 310. Rather, the Wi-Fi client device 104 would send a normal data packet instead of a sleep response packet thereby ending the sleep cycle.

In at least one embodiment, the sleep interval determination module 208 uses the following illustrative adaptive algorithm:

ACTIVE:
Measure the "Wi-Fi Network idle time"
SHORT_SLEEP:

```
if ("Wi-Fi Network idle time" > thresh)
    first = true
    sleep for a time period of init;
    while (1)
        cur = first? init : (cur+step) first = false;
        if receive or transmit a packet
            if (cur < init)
                init = max(init – step, min);
            pre = cur; goto ACTIVE;
```

```
if ((cur > init + step) && (pre > init + step))
    init = min(init + step, max);
if (cur >= thresh_1)
    pre = cur; goto LONG_SLEEP;
sleep for a time period of step;
```

LONG_SLEEP:

```
while(1)
    sleep for a time period of long;
    if receive or transmit a packet;
        goto ACTIVE;
```

The adaptive algorithm provided above (or a similar algorithm) may be configured to determine an optimal sleep duration interval such that the AP sleep scheduling module 206 can wake up the Wi-Fi network interface 204 shortly before an expected normal data packet may arrive from the one or more providers 106(1) . . . 106(N) in accordance with data packet exchange patterns. Additionally, the adaptive algorithm provided above may be configured to determine an optimal sleep duration interval so that the AP sleep scheduling module 206 can wake up the Wi-Fi network interface 204 shortly before the Wi-Fi client device 104 may want to transmit a normal data packet to the Wi-Fi tethering device 102. In various embodiments, the optimal sleep duration interval determined by the adaptive algorithm may be the first sleep duration after an idle interval has been monitored and identified. In this sense, the Wi-Fi tethering device 102 and the Wi-Fi client device 104 may not have to wake up and agree on multiple continuous sleep duration intervals in the sleep cycle.

In various embodiments, the sleep interval determination module 208 may set and/or dynamically adjust one or more of the parameter values in the adaptive algorithm provided above based on idle intervals and/or data packet exchange patterns associated with the applications executing on the Wi-Fi client device 104. Accordingly, the sleep interval determination module 208 may use the adaptive algorithm to first set one or more sleep duration intervals in accordance with the short sleep stage 216 (e.g., the content fetching phase), and then the sleep interval determination module 208 may transition to setting one or more sleep duration intervals in accordance with the long sleep stage 218 (e.g., content consuming phase), as further discussed herein.

Accordingly, in various embodiments, thresh may be a value that is far less than the several minutes threshold used in the conventional approaches. For example, thresh may be less than a minute or even less than a second. In at least one embodiment, thresh may be 150 ms. Normal packet inter-arrival intervals that are less than 150 ms account for more than 80%, and sometimes 90%, of all the normal data packets communicated in association with news reading applications, online book reading applications, video streaming applications, search applications, map and directions applications, email applications, and RSS reader applications. Thus, the AP sleep scheduling module 206 and/or the sleep interval determination module 208 may use the time of 150 ms as an idle threshold (thresh) to determine whether or not to send a sleep request and potentially switch the Wi-Fi network interface 204 from a normal state to a sleep state. In other embodiments, thresh may be another value, e.g., 60 ms, 200 ms, 300 ms and so forth.

In various embodiments, the value min is the minimum amount of time that the AP sleep scheduling module 206 and/or the sleep interval determination module 208 may put the Wi-Fi network interface 204 in the sleep state. Since there is limited power-saving benefit of turning the Wi-Fi network interface 204 off for less than 100 ms due to energy overhead, in at least one embodiment the sleep interval determination module 208 may set the value of min to be 100 ms. In other embodiments, the sleep interval determination module 208 may set the value of min to be a value higher than 100 ms (e.g., 150 ms, 200 ms, 250 ms, etc.)

In various embodiments, the value max is the maximum amount of time that the AP sleep scheduling module 206 and/or the sleep interval determination module 208 may put the Wi-Fi network interface 204 into the sleep state. Due to RTT and latency considerations for the network interface(s) 202, in at least one embodiment, the sleep interval determination module 208 sets max to a value of 500 ms. In other embodiments, the sleep interval determination module 208 may set max to another value, e.g., 300 ms, 400 ms, 600 ms, 700 ms, one second and so forth.

In various embodiments, the value of init is a value that varies between min and max, and the value init is adaptive so that the optimal sleep duration interval can be determined in accordance with the short sleep stage 216 and long sleep stage 218. The sleep interval determination module 208 may originally set the value init to min (a conservative starting value when first=true, i.e., the first sleep slot for a sleep cycle). As further discussed herein, the value of init may then be gradually increased until a normal data packet, not a sleep request packet or sleep response packet, interrupts the sleep cycle. Accordingly, the sleep interval determination module 208 can then update the value of init in accordance with a sleep cycle history, and then use the updated value of init for the next sleep cycle (e.g., after a normal data packet is communicated and another idle interval of thresh is monitored). In various embodiments, the value of init may also be decreased. Consequently, the value of init is an adaptive value that may be different for each separate sleep cycle that occurs between normal data packet exchange.

In various embodiments, the AP sleep scheduling module 206 monitors the Wi-Fi network idle time. When the Wi-Fi network interface 204 remains idle for a time period of thresh, the AP sleep scheduling module 206 will first set the time duration for a sleep request packet in accordance with the short sleep stage by providing the value of init, which may originally be min (e.g., 100 ms). Then, when the AP sleep scheduling module 206 wakes up the Wi-Fi network interface 204 from the sleep state after init (e.g., 100 ms), the Wi-Fi tethering device 102 will determine whether or not there are any pending outgoing normal data packets (i.e. received from the providers 106(1) ... 106(N) and stored in the packet buffer 220) that need to be sent to the Wi-Fi client device 104. If there are no pending outgoing normal data packets, the AP sleep scheduling module 206 may send another sleep request packet to the Wi-Fi client device 104, and the Wi-Fi client device 104 will agree to another sleep interval duration if there are no normal data packets buffered in the packet buffer 310 and ready to send to the Wi-Fi tethering device 102. Accordingly, this another sleep request packet sent by the Wi-Fi tethering device 102 may include a sleep duration interval set in accordance with a value for step.

In various embodiments, the sleep interval determination module 208 may set the value of step to be a fixed period of time (e.g., 100 ms). In other embodiments, the sleep interval determination module 208 may set step to be 150 ms, 200 ms, 250 ms, 300 ms, and so forth.

Thus, depending on a time when a normal data packet is buffered and ready to be communicated by the Wi-Fi tethering device 102 or the Wi-Fi client device 104, a total length of the sleep cycle may vary based on the value of init (e.g., the first sleep slot in the sleep cycle), and a number of step sleep slots after init. Consequently, the sleep cycle may be referred to as (init+N*step) wherein N is the number of continuous step sleep slots added to the initial sleep duration interval because no normal data packets are buffered and ready to be communicated to, or from, the Wi-Fi tethering device 102.

As mentioned above, the adaptive algorithm used by the sleep interval determination module 208 is configured to adjust and update the value of init so that the AP sleep scheduling module 206 is able to reduce the number of "unnecessary wakeups" of the Wi-Fi network interface 204. An unnecessary wakeup occurs when the Wi-Fi network interface 204 is woken up from the sleep state, but no normal data packets are ready to be sent or received. Accordingly, a good init value will allow the Wi-Fi network interface 204 to sleep as long as possible before waking up at an opportune time (e.g., just before a normal packet is ready to be communicated).

Therefore, in various embodiments, the sleep interval determination module 208 determines the init value by exploiting the sleep history based on idle intervals (e.g., one or more previous sleep cycles and/or frequency of receipt of normal data packets). For example, the sleep interval determination module 208 may use the parameters cur and pre in the adaptive algorithm to track the total length of successful sleep slots in the current sleep cycle (cur) and that in the previous sleep cycle (pre). That is, cur is a timing value that may equal (init+(N−1)*step) because a sleep cycle ends after a "false" sleep slot, or step value, during which a normal data packet arrives and is buffered for communication at the Wi-Fi tethering device 102 or at the Wi-Fi client device 104. The parameter pre may be referred to as an ongoing record of the previous timing value cur. Using the values of cur and pre, the sleep interval determination module 208 adjusts the value of init with an update algorithm as follows:

If both cur and pre are greater than the current value of init plus step, the sleep interval determination module 208 increases init by step for the next sleep cycle (i.e., the next idle interval of thresh).

If cur is less than the current value of init minus step, the sleep interval determination module 208 decreases init by step for the next sleep cycle.

As seen above, the update algorithm decreases the value of init by considering the length of the current sleep cycle and increases the value of init by considering the length of both the current sleep cycle and the previous sleep cycle.

In various embodiments, the value of init is capped to the value of max (e.g., 500 ms) to avoid excessive latency. In the short sleep stage 216, if the Wi-Fi network interface 204 has been in the sleep state (e.g., a current sleep cycle) for a time period of thresh_l, then the AP sleep scheduling module 206 and/or the sleep interval determination module 208 may then switch to the long sleep stage 218, where the Wi-Fi network interface 204 may be put to sleep for a sleep duration interval of max (e.g., 500 ms). In at least one embodiment, the long sleep stage 218 is periodic such that the AP sleep scheduling module 206 wakes up the Wi-Fi network interface 204 after each max sleep duration interval to check, via the sleep protocol, if communication with the Wi-Fi client device 104 is waiting (e.g., a normal data packet is buffered and waiting to be communicated).

Accordingly, in various embodiments, the value of thresh_1 is a threshold value used by the sleep interval determination module 208 to switch or transition the sleep duration interval from short sleep stage 216 to the long sleep stage 218. In various embodiments, the value of thresh_1 may be set to three seconds. In other embodiments, the value of thresh_1 may be set to another value, e.g., one second, two seconds, four seconds, ten seconds, and so forth.

Figure 6:
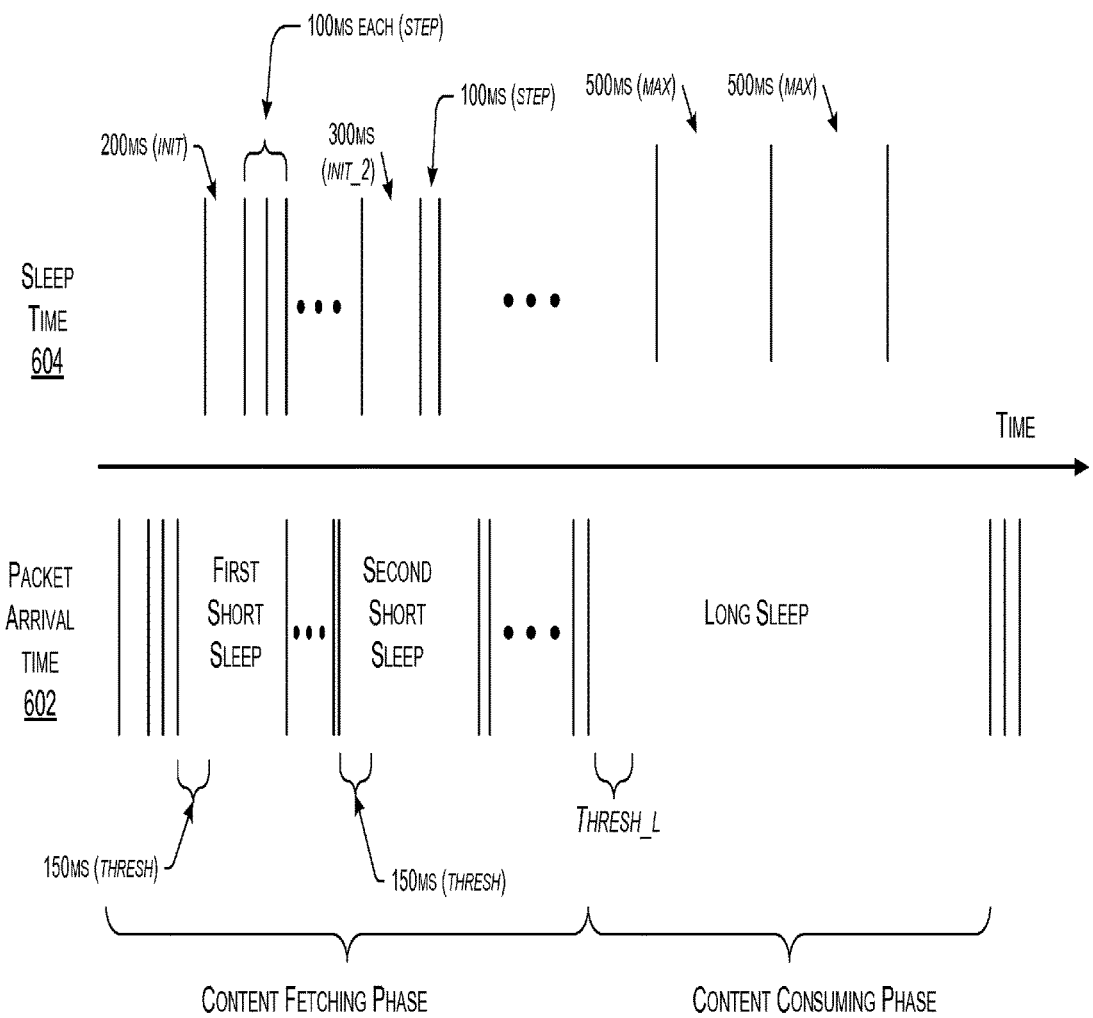
FIG. 6 illustrates an example sleep schedule, in accordance with various embodiments described herein.

FIG. 6 illustrates an example sleeping schedule 600, where the sleep duration determination module 208 determines the sleep duration intervals (e.g., the sleep slots) in accordance with selective parameters discussed in the adaptive algorithm. FIG. 6 depicts a "time" axis. FIG. 6 is a small illustrative timing segment of a complete sleep procedure (i.e., there may be sleep cycles before and/or after those illustrated in FIG. 6).

A normal packet arrival time 602 is depicted below the time axis (showing three sleep cycles, the first short sleep, the second short sleep, and the long sleep) and sleep time 604 (e.g., multiple different sleep duration intervals as a small segment of a complete sleep procedure) is depicted above the time axis. Each line or tick mark depicted in association with the normal packet arrival time 602 represents a normal data packet ready to be communicated by the Wi-Fi tethering device 102 or the Wi-Fi client device 104 in the normal modes of Wi-Fi communication. Timing considerations associated with the sleep protocol (e.g., the sleep request packet and the sleep response packet) are not included in FIG. 6. Moreover, the time intervals in FIG. 6 may not be drawn to scale.

In FIG. 6, the value of init associated with the first short sleep stage is 200 ms, the value of step is 100 ms, and the value of thresh is 150 ms. As shown in the content fetching phase of FIG. 6, the AP sleep scheduling module 206 and the sleep interval determination module 208 put the Wi-Fi interface 204 to sleep for 200 ms, or init (as illustrated above the time axis) after an idle network interval (i.e., no arrival of normal data packets) of 150 ms, or thresh, has been reached and passed (as illustrated below the time axis). After the sleep interval duration of init, the AP sleep scheduling module 206 and the sleep interval determination module 208 continues the sleep cycle for the Wi-Fi interface 204 for two steps of 100 ms (as illustrated above the time axis). In this example, assume that the second of the two step sleep slots associated with the first short sleep stage is a failed sleep slot because a normal data packet has arrived, and therefore, the sleep cycle ends.

Then, using the adaptive algorithm, the value of init may update and increase to 300 ms, as depicted as init_2, for the second short sleep stage. Accordingly, the AP sleep scheduling module 206 and the sleep interval determination module 208 will put the Wi-Fi interface 204 in sleep mode for 300 ms (e.g., init_2) followed by one more successful 100 ms step sleep slot before another normal data packet is buffered and ready for communication.

Furthermore, as depicted in the content consuming phase, after sleeping for a time period of thresh_1 (e.g., three seconds), the AP sleep scheduling module 206 and the sleep interval determination module 208 will put the Wi-Fi network interface 204 in the sleep state in accordance with a long sleep stage 218 where the Wi-Fi network interface 204 will periodically sleep for a time period of long or max (e.g., 500 ms).

Accordingly, the adaptive algorithm above may be designed for the data exchange patterns of typical applications executing on the Wi-Fi client device 104. In various embodiments, sleep duration intervals determined in accordance with the short sleep stage 216 may be designed for the Wi-Fi interfaces to sleep between a time when the Wi-Fi client device 104 sends a content request intended for a provider 106(N) (e.g., a remote Web server) and a time when the first response packet from the provider is received at the Wi-Fi tethering device 102. This duration may be a RTT of a connection using network(s) 108 (e.g., a 3G connection). Moreover, as shown in the FIG. 6 example, the value of init is adapted based on a sleep cycle history.

Illustrative Processes

Figure 7:
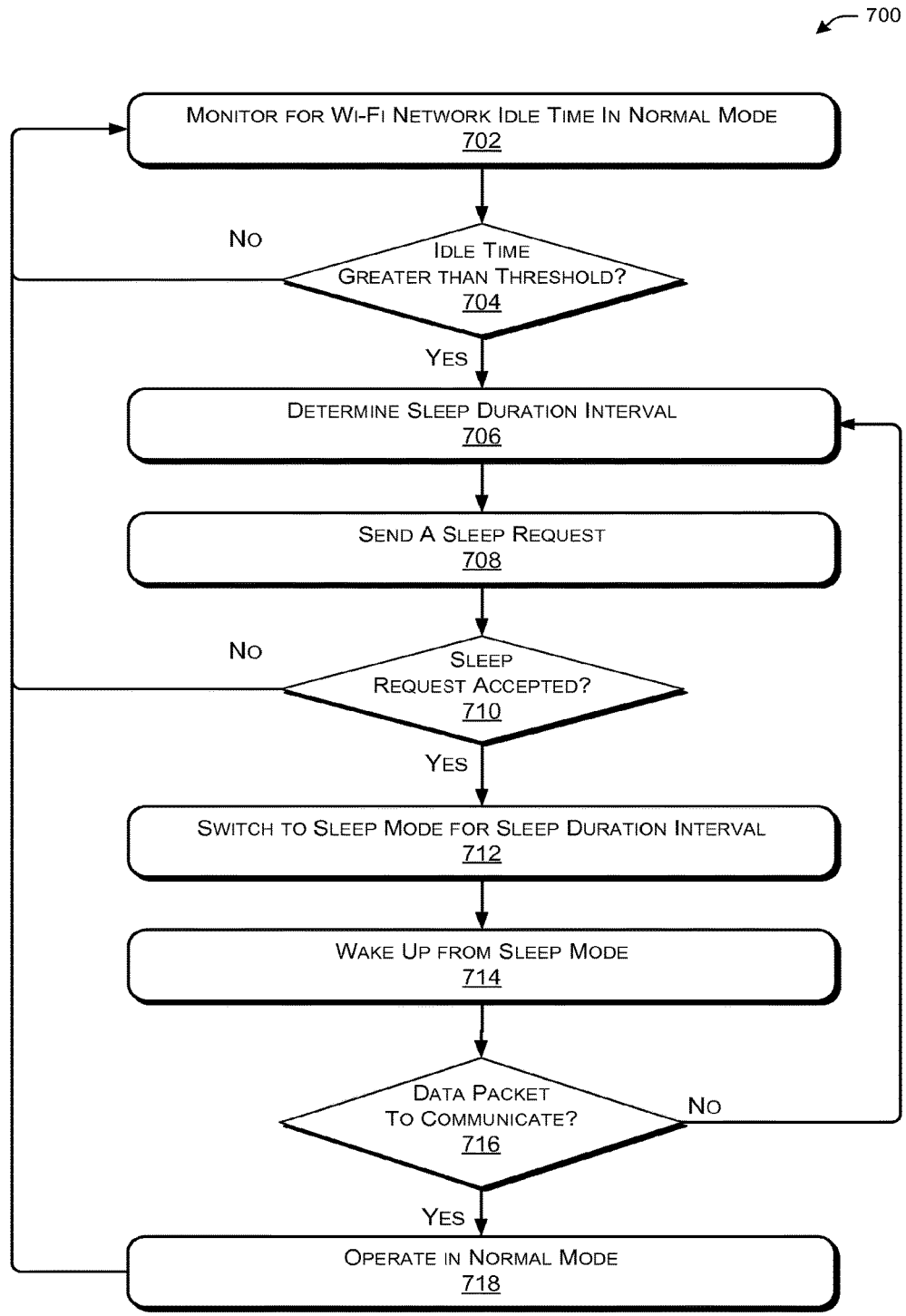
FIG. 7 illustrates an example power saving process for a Wi-Fi tethering device, in accordance with various embodiments described herein.
Figure 8:
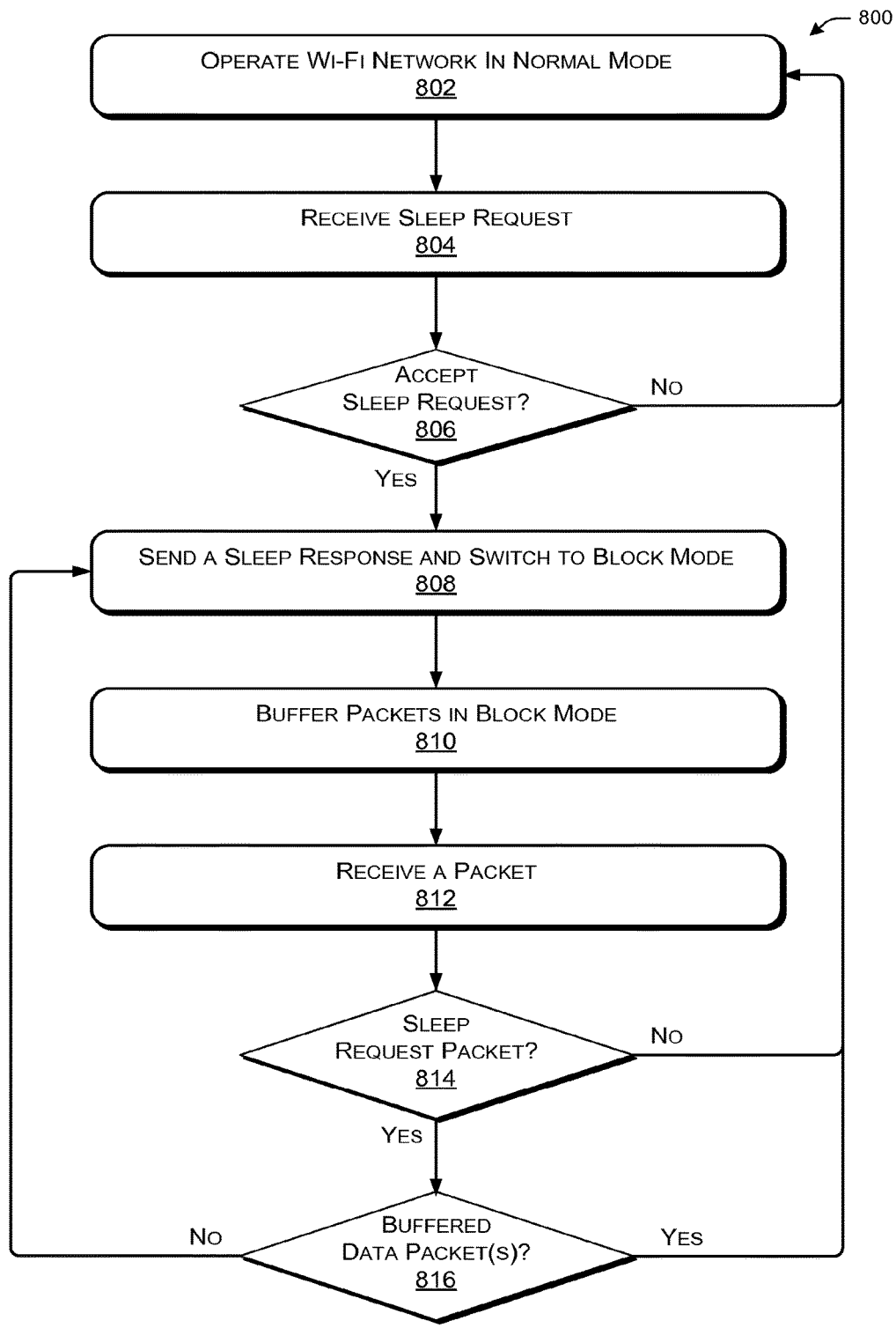
FIG. 8 illustrates an example power saving process for a Wi-Fi client device, in accordance with various embodiments described herein.

Example operations are described herein with reference to FIGS. 7 and 8. The processes are illustrated as a logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, modules, data structures, and the like that perform particular functions or implement particular abstract data types. The order in which the operations are described is not intended to be construed as a limitation, and any number of the described operations can be combined in any order and/or in parallel to implement the process.

FIG. 7 illustrates an example process 700 directed to placing the Wi-Fi network interface 204 of the Wi-Fi tethering device 102 in the sleep state.

At operation 702, the AP Wi-Fi power saving module 118 monitors the Wi-Fi network interface 204 for idle intervals during normal mode 210. As discussed above, the idle intervals may be short intervals in association with a content fetching phase or longer intervals in association with a content consuming phase.

At operation 704, the AP Wi-Fi power saving module 118 determines if an idle interval has reached and passed a threshold. If the idle interval has not reached the threshold ("No" at operation 704), then the AP Wi-Fi power saving module 118 continues to monitor the Wi-Fi network interface 204 for idle intervals by returning to operation 702. As discussed above, the threshold may be pre-defined in accordance with measured data packet exchange patterns (e.g., thresh may be 100 ms, 150 ms, 200 ms, 250 ms, 300 ms and so forth)

If the idle interval has reached and passed the threshold ("Yes" at operation 704), then at operation 706 the sleep interval determination module 208 determines a sleep duration interval in accordance with the adaptive algorithm (i.e., the sleep duration interval may initially be a variable parameter init), as discussed above. The sleep interval determination module 208 may then pass the determined sleep duration interval to the AP sleep scheduling module 206. In various embodiments, the first sleep duration interval (e.g., init) of a sleep cycle may be associated with a short sleep stage 216.

At operation 708, the AP sleep scheduling module 206 configures and sends, to the Wi-Fi client device 104, a sleep request that includes the determined sleep interval duration. For example, the AP sleep scheduling module 206 may send the sleep request packet depicted in FIG. 4A. Moreover, when the AP sleep scheduling module 206 sends the sleep request, it may also switch from the normal mode 210 to the pre-sleep mode 212.

At operation 710, the AP sleep scheduling module 206 determines whether or not the sleep request is accepted. For example, the AP sleep scheduling module 206 may determine that the sleep request is not accepted (e.g., rejected) by the Wi-Fi client device 104 if a normal data packet is received from the Wi-Fi client device 104 instead of a sleep response packet. If a rejection occurs (e.g., "No" at operation 710), then the AP Wi-Fi power saving module 118 continues to monitor the Wi-Fi network interface 204 for idle intervals by returning to operation 702.

If the AP sleep scheduling module 206 receives a sleep response from the Wi-Fi client device 104 (e.g., the sleep response packet in FIG. 4B), then at operation 712, the AP sleep scheduling module 206 switches from the pre-sleep mode 212 to the sleep mode 214 for the determined sleep duration interval. Moreover, the AP sleep scheduling module 206 places the Wi-Fi network interface 204 in the sleep state. In various embodiments, the AP sleep scheduling module 206 may only place the Wi-Fi network interface 204 in the sleep state if the Wi-Fi client device 104 agrees to sleep (e.g., a sleep response packet with the same or copied sequence number and sleep duration is received). Moreover, while in sleep mode 214, the Wi-Fi tethering device 102 buffers normal data packets received from the providers 106(1) . . . 106(N) that are to be communicated to the Wi-Fi client device 104.

At operation 714, the AP sleep scheduling module 206 wakes up the Wi-Fi network interface 204 from the sleep state when the agreed upon sleep duration interval has expired.

In various embodiments, at operation 716, the AP sleep scheduling module 206 determines whether there is a normal data packet in the packet buffer 220 that is ready to be communicated to the Wi-Fi client device 104. If there is a normal data packet to communicate to the Wi-Fi client device 104 ("Yes" at operation 716), the AP sleep scheduling module 206 switches from sleep mode 214 back to normal mode 210 and operates the Wi-Fi network interface 204 so the buffered normal data packets can be communicated at operation 718.

In various embodiments, if the AP sleep scheduling module 206 determines that there are not any normal data packets stored in the packet buffer 220 ready to communicate to the Wi-Fi client device 104 ("No" at operation 716), then the AP sleep scheduling module 206 may return to operation 706 where another sleep duration interval is accessed (e.g., a pre-defined value for step) and the process continues from operation 706 by sending another sleep request. In this example scenario, if the Wi-Fi client device 104 responds with another sleep response, then the Wi-Fi network interface 204 may stay the sleep state and continue its sleep cycle (e.g., one or more sleep slots), as discussed above. In various embodiments, the sleep duration interval provided in the another sleep request may be associated with a short sleep stage 216 or a long sleep stage 218 (e.g., the duration may be a value associated with step, long, min, max, etc.).

In various embodiments, when the AP sleep scheduling module 206 switches to normal mode at operation 718, then it returns to operation 702 in the example process 700 of FIG. 7 and may repeat the process for multiple different network idle times associated with a content fetching phases, a content consuming phases, or a combination thereof, as illustrated in FIG. 6, for example.

FIG. 8 illustrates an example process 800 directed to placing the client sleep scheduling module 304 of the Wi-Fi client device 104 in block mode 308.

At operation 802, the client sleep scheduling module 304 of the Wi-Fi client device 104 is operating in normal mode 306. Accordingly, the Wi-Fi client device 104 may be exchanging normal data packets with the Wi-Fi tethering device 102 during a content fetching phase.

At operation 804, the Wi-Fi client device 104 receives a sleep request from the Wi-Fi tethering device 102.

At operation 806, the client Wi-Fi power saving module 126 decides whether to reject ("No") or accept ("Yes") the sleep request. In various embodiments, the client Wi-Fi power saving module 126 may decide to reject the sleep request when it has normal data packets to communicate to the Wi-Fi tethering device 102. In this scenario the process returns to operation 802. In contrast, the client Wi-Fi power saving module 126 may decide to accept the sleep request when there are normal data packets to communicate to the Wi-Fi tethering device 102.

If the client Wi-Fi power saving module 126 decides to accept the sleep request ("Yes" at operation 806), at operation 808, the client sleep scheduling module 304 configures and sends a sleep response to the Wi-Fi tethering device 102. In at least one embodiment, the sleep response is a sleep response packet discussed above with respect to FIG. 4B. In various embodiments, the client sleep scheduling module 304 indicates its acceptance by copying a sequence number and a sleep duration interval, and including the sequence number and the sleep duration interval in the response. Moreover, the client sleep scheduling module 304 may switch from normal mode 306 to block mode 308 for the sleep duration interval.

At operation 810, while in block mode 308, the Wi-Fi client device 104 buffers any normal data packets to be communicated to the Wi-Fi tethering device 102. As discussed above, the Wi-Fi client device 104, while in block mode 308, may not receive any normal data packets from the Wi-Fi tethering device 102 because the devices have agreed upon a sleep schedule using the sleep request/sleep response protocol.

At operation 812, the Wi-Fi client device 104 may receive a packet from the Wi-Fi tethering device 102. In various embodiments, this packet is received after the agreed upon sleep duration interval communicated in the sleep request received at operation 804 has expired.

At operation 814, the client sleep scheduling module 304 determines if the packet received at operation 812 is a sleep request packet. If the client sleep scheduling module 304 determines that the packet received at operation 812 is not a sleep request packet, but rather a normal data packet, ("No" at operation 814), then the client sleep scheduling module 304 switches from block mode 308 to normal mode 306 and returns to operation 802 where normal data packets that have been buffered at the Wi-Fi tethering device 102 and/or the Wi-Fi client device 104 are exchanged.

If the client sleep scheduling module 304 determines that the packet received at operation 812 is a sleep request packet ("Yes" at operation 814), then at operation 816, the client sleep scheduling module 304 may determine whether normal data packets were stored in the packet buffer 310 at operation 810. When no normal data packets have been stored in the packet buffer 310 ("No" at operation 816), then the process 800 may return to operation 808 where the Wi-Fi client device 104 sends a sleep response packet to the Wi-Fi tethering device 102 and the client sleep scheduling module 304 remains in block mode 308.

If the client sleep scheduling module 304 determines that normal data packets have been stored in the packet buffer 310 ("Yes" at operation 816), then the client sleep scheduling module 304 switches from block mode 308 to normal mode 306 and returns to operation 802 where the normal data packets that have been stored are exchanged between the Wi-Fi tethering device 102 and the Wi-Fi client device 104.

Accordingly, the example process 800 of FIG. 8 may also be repeated for multiple different network idle times associated with content fetching phases, content consuming phases, or a combination thereof, as illustrated in FIG. 6, for example.

In various embodiments, the Wi-Fi tethering device 102 may support multiple different Wi-Fi client devices 104(1) . . . 104(N) (as illustrated in FIG. 1). Accordingly, the Wi-Fi tethering device 102 may perform the example processes in FIGS. 7 and 8 with each of the multiple different Wi-Fi client devices 104(1) . . . 104(N). The Wi-Fi tethering device 102 may only be able to put the Wi-Fi network interface 204 to sleep only if it receives sleep responses, for a given period of time, from each of the Wi-Fi client devices 104(1) . . . 104(N). Thus, it is understood that the Wi-Fi tethering device 102 may not be able to sleep as much in a multi-client scenario when compared to a single-client scenario.

CONCLUSION

Although the subject matter has been described in language specific to structural features and/or methodological acts, it is to be understood that the subject matter defined in the appended claims is not necessarily limited to the specific features or operations described above. Rather, the specific features and operations described above are described as examples for implementing the claims.

What is claimed is:

1. A computing device comprising:
one or more processors;
a Wi-Fi network interface; and
one or more computer memories, coupled to the one or more processors and storing instructions which, when executed by the one or more processors, cause the one or more processors to:
exchange data packets with a Wi-Fi tethering device that provides an Internet connection to the computing device;
receive a sleep request packet from the Wi-Fi tethering device;
in an instance when the computing device lacks further data packets to communicate to the Wi-Fi tethering device, respond to the sleep request packet by:
extracting a sequence number from the sleep request packet;
including the sequence number in a sleep response packet; and
sending the sleep response packet to the Wi-Fi tethering device; and
in another instance when the computing device has the further data packets to communicate to the Wi-Fi tethering device, respond to the sleep request packet by sending the further data packets to the Wi-Fi tethering device without sending the sleep response packet to the Wi-Fi tethering device.

2. The computing device of claim 1, wherein the instructions, when executed by the one or more processors, cause the one or more processors to:
extract a sleep interval from the sleep request packet;
include the sleep interval in the sleep response packet; and
block transmissions to the Wi-Fi tethering device during the sleep interval.

3. The computing device of claim 1, embodied as a laptop computer.

4. The computing device of claim 1, wherein the sleep response packet conveys to the Wi-Fi tethering device that the Wi-Fi tethering device may enter a Wi-Fi sleep mode and wherein the further data packets convey to the Wi-Fi tethering device that the Wi-Fi tethering device may not enter the Wi-Fi sleep mode.

5. The computing device of claim 4, wherein the instructions, when executed by the one or more processors, cause the one or more processors to:
after sending the sleep response packet to the Wi-Fi tethering device, buffer additional data packets on the computing device during a sleep interval when the Wi-Fi tethering device is in the Wi-Fi sleep mode.

6. The computing device of claim 5, wherein the instructions, when executed by the one or more processors, cause the one or more processors to:
upon expiration of the sleep interval, send the additional data packets to the Wi-Fi tethering device.

7. The computing device of claim 1, embodied as a laptop computer.

8. The computing device of claim 1, wherein the sleep response packet is a Wi-Fi unicast packet.

9. A method performed by a tethered computing device, the method comprising:
communicating data packets via a wireless connection with a tethering computing device that provides a network connection to the tethered computing device;
receiving a sleep request packet from the tethering computing device;
in an instance when the tethered computing device has at least one data packet to communicate to the tethering computing device, responding to the sleep request packet by sending the at least one data packet to the tethering computing device without sending a sleep response packet to the tethering computing device; and
in another instance when the tethered computing device does not have data packets to communicate to the tethering computing device:
extracting a sequence number from the sleep request packet;
including the sequence number in a sleep response packet;
sending the sleep response packet to the tethering computing device;
entering a block mode while the tethering computing device is not available for wireless communication with the tethered computing device for a sleep interval;
during the sleep interval, buffering further data packets at the tethered computing device; and
when the sleep interval ends, exiting the block mode and sending the buffered further data packets to the tethering computing device.

10. The method of claim 9, wherein the wireless connection is a Wi-Fi connection.

11. The method of claim 9, wherein the network connection is an Internet connection.

12. The method of claim 9, the sleep request packet specifying the sleep interval.

13. The method of claim 12, further comprising:
receiving a subsequent sleep request packet while the tethered computing device is still in the block mode and lacks any further data packets to send to the tethering computing device, the subsequent sleep request packet having another sequence number and specifying another sleep interval;

responding to the subsequent sleep request packet by copying the another sequence number into another sleep response packet and sending the another sleep response packet to the tethering computing device; and remaining in the block mode for the another sleep interval specified by the subsequent sleep request packet.

14. A computing device comprising:
one or more processors;
a wireless network interface; and
one or more computer memories, coupled to the one or more processors and storing instructions which, when executed by the one or more processors, cause the one or more processors to:
exchange data packets with a wireless tethering device that provides an Internet connection to the computing device;
receive a sleep request packet from the wireless tethering device, the sleep request packet including a sequence number and a specified sleep interval;
in an instance when the computing device lacks further data packets to send to the wireless tethering device:
copy the sequence number from the sleep request packet into a sleep response packet;
send the sleep response packet to the wireless tethering device; and
cease exchanging the data packets with the wireless tethering device for the specified sleep interval; and
in another instance when the computing device has at least one data packet to communicate to the wireless tethering device, respond to the sleep request packet by sending the at least one data packet to the wireless tethering device without sending a sleep response packet to the wireless tethering device.

15. The computing device of claim 14, wherein the instructions, when executed by the one or more processors, cause the one or more processors to:
enter a block mode for the specified sleep interval.

16. The computing device of claim 15, wherein the instructions, when executed by the one or more processors, cause the one or more processors to:
while in the block mode:
receive a subsequent sleep request packet having another sequence number; and
when the computing device lacks the further data packets to send to the wireless tethering device:
copy the another sequence number into another sleep response packet;
send the another sleep response packet to the wireless tethering device; and
remain in the block mode for another specified sleep interval specified by the subsequent sleep request packet.

17. The computing device of claim 16, wherein the instructions, when executed by the one or more processors, cause the one or more processors to:
buffer additional data packets received on the computing device during the another specified sleep interval.

18. The computing device of claim 17, wherein the instructions, when executed by the one or more processors, cause the one or more processors to:
upon expiration of the another specified sleep interval, communicate the additional data packets to the wireless tethering device.

19. The computing device of claim 17, wherein the instructions, when executed by the one or more processors, cause the one or more processors to:
while in the block mode after receiving the subsequent sleep request packet, receive a further sleep request packet; and
responsive to a determination that the additional data packets are buffered and ready to send to the wireless tethering device:
exit the block mode and enter a normal mode; and
respond to the further sleep request packet by sending the additional data packets, without a further sleep response packet, to the wireless tethering device.

20. The computing device of claim 14, embodied as a laptop, a mobile phone, a smart phone, a personal digital assistant, a tablet, a media player, a gaming device, or an image recording device.

* * * * *